Nov. 29, 1966  W. C. JONES  3,288,083
LOCOMOTIVE TRUCK
Filed Sept. 13, 1963  3 Sheets-Sheet 1
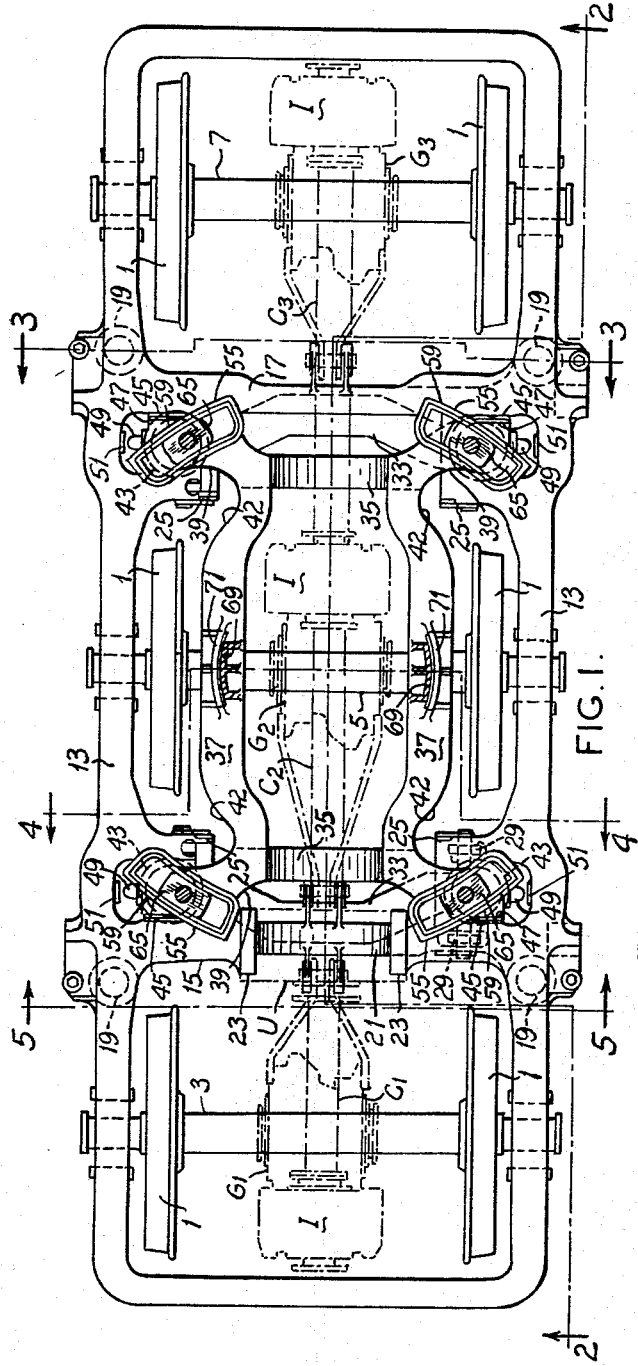
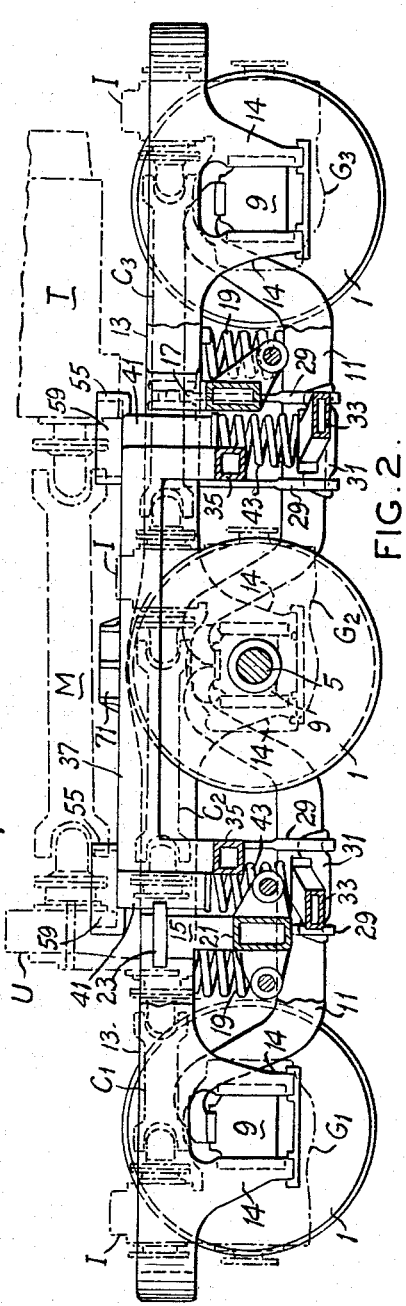
INVENTOR
WILLIAM C. JONES
BY Bedell & Burgess
ATTORNEYS INVENTOR
WILLIAM C. JONES
BY Bedell & Burgess
ATTORNEYS Nov. 29, 1966  W. C. JONES  3,288,083
LOCOMOTIVE TRUCK
Filed Sept. 13, 1963  3 Sheets-Sheet 3

INVENTOR
WILLIAM C. JONES
BY Bedell & Burgess
ATTORNEYS

United States Patent Office 3,288,083
Patented Nov. 29, 1966

3,288,083
LOCOMOTIVE TRUCK
William C. Jones, Granite City, Ill., assignor to General Steel Industries, Inc., Granite City, Ill., a corporation of Delaware
Filed Sept. 13, 1963, Ser. No. 308,718
9 Claims. (Cl. 105—34)

The invention relates to railway rolling stock and consists particularly in a six-wheel power truck for diesel hydraulic locomotives.

Conventional motor trucks for diesel electric locomotives pivotally support the body at the center of the truck by means of mating pivot center plates on the truck bolster and locomotive underframe. In hydraulic drive locomotives the provision of conventional center plates is not feasible because the space normally occupied by the mating center plates is occupied by portions of the hydraulic drive apparatus. In some diesel hydraulic locomotives, the hydraulic transmission is located in the cab over one of the truck end axles and is connected by a longitudinally extending Cardan shaft above the middle axle of an upwardly projecting portion of the truck input gear box carried by the truck frame between the middle and opposite end axles, and through the latter by longitudinally extending Cardan shafts, to the three axle gear boxes. To provide satisfactory riding qualities at higher speeds by preventing the transmission of lateral forces from the track to the locomotive cab, it is usually necessary to embody in the trucks a bolster laterally movable with respect to the truck frame, and the provision of such a laterally movable bolster additionally complicates the spatial problem of providing a truck for hydraulic drive locomotives.

It is accordingly a main object of the invention to provide a truck on which the locomotive body or cab is supported entirely at points spaced from the center of the truck, leaving the central portion of the truck clear for protruding gear boxes, drive shafts, and the like.

It is a further object to provide a lateral motion bolster truck in which the supports for the vehicle body are spaced from the center of the truck to permit the location there of gear boxes, drive shafts and similar equipment.

It is a further object of the invention to provide a lateral motion truck in which the support points for the locomotive cab are sufficiently spaced apart laterally of the truck to permit the passage therethrough of drive shafts and to accommodate necessary lateral motion of the truck bolster.

The foregoing and additional more detailed objects and advantages will be achieved by the structure described hereinbelow and illustrated in the accompanying drawings, in which:

FIG. 1 is a plan view of a truck embodying the invention.

FIG. 2 is a side elevation view of the truck illustrated in FIG. 1, partially sectionalized along line 2—2 of FIG. 1.

Figure 3:
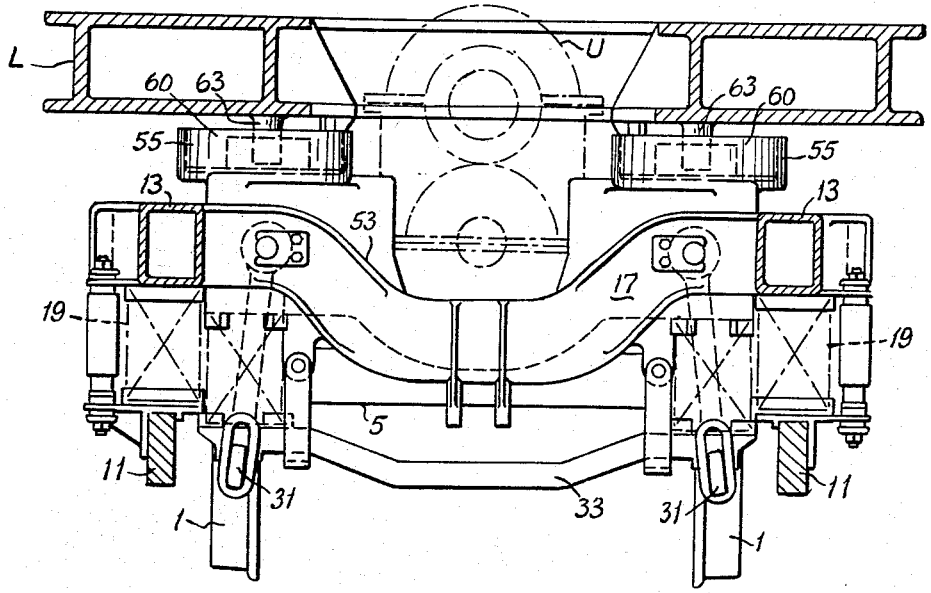
Figure 4:
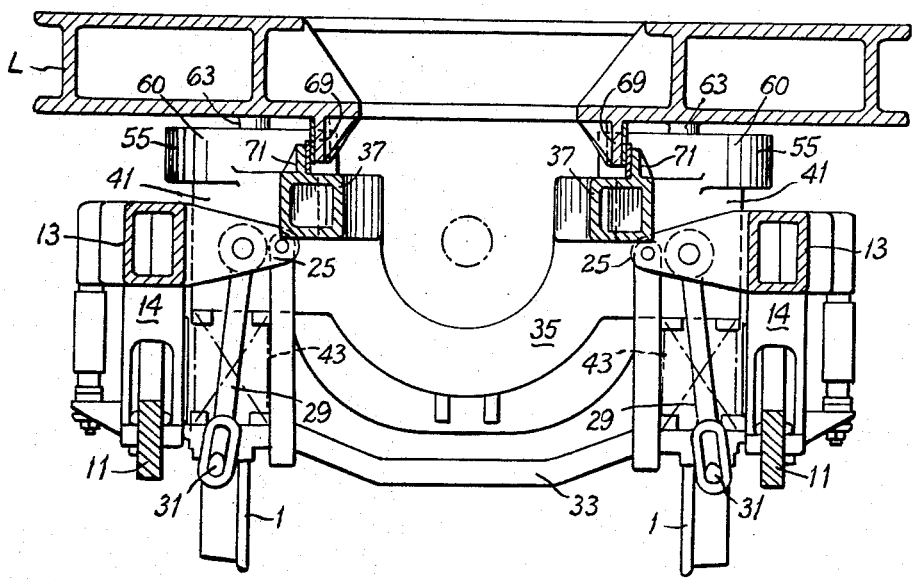
Figures 5, 6, 7, 8:
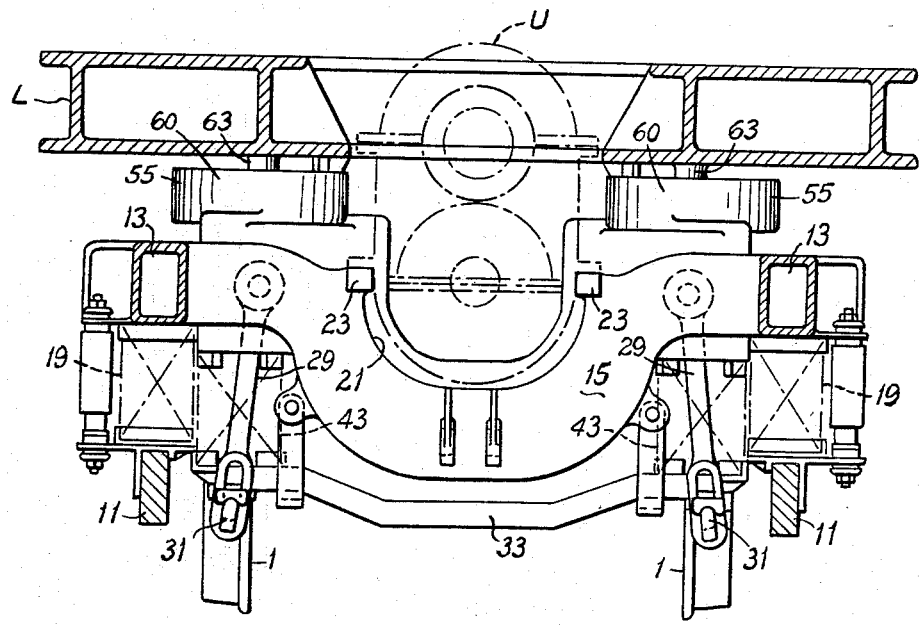

FIGS. 3, 4 and 5 are transverse vertical sectional views along lines 3—3, 4—4 and 5—5, respectively, of FIG. 1.

FIG. 6 is an enlarged top view of one of the loading pads by which the locomotive load is supported on the truck bolster.

FIG. 7 is a vertical sectional view along arcuate center line 7—7 of FIG. 6.

FIG. 8 is a vertical sectional view along radial center line 8—8 of FIG. 6.

The truck comprises three pairs of wheels 1 mounted respectively on spaced axles 3, 5 and 7. At its ends outboard of the wheels each of the axles rotatably mounts journal boxes 9, and drop equalizers 11 are seated on and extend between the middle axle and end axle journal boxes at each side of the truck. A rigid truck frame including longitudinally extending side members 13 spaced apart transversely of the truck and connected intermediate the middle and end axles by transverse transoms 15 and 17 is supported by upright coil springs 19 on equalizers 11. Frame side members 13 are each provided with three pairs of depending pedestal legs 14 adjacent each of the axles and vertically slidably receiving journal boxes 9, vertical movement of the axles relative to the truck frame being accommodated by yieldability of springs 19.

The axles are each driven by gear boxes $G_1$, $G_2$ and $G_3$ mounted on the individual axles and each having an upper power input portion I which extends somewhat above the upper level of truck frame side members 13. Transom 15 is substantially depressed as at 21 intermediate its ends and is provided with machined pads 23 at each side of its central depression for supporting truck mounted input gear train unit U, which is connected by main drive shaft M having Cardan joints at both ends to hydraulic transmission T mounted on locomotive under frame L. Truck mounted gear train unit U is connected respectively by Cardan shafts $C_1$ and $C_2$ to the input portions I of the adjacent end axle 3 gear box and middle axle 5 gear box, which, in turn, is connected by Cardan shaft $C_3$ to the input portion I of opposite end axle 7 gear box $G_3$.

It will be evident from the drawing that it would not be feasible to utilize a conventional center plate support for the cab of a locomotive embodying this type of drive. To accommodate the driving means illustrated and at the same time provide both pivotal and lateral movement between the locomotive cab and the truck frame, frame side members 11 are provided with inwardly extending brackets 25 intermediate middle axle 5 and transoms 15 and 17 respectively and from the end portions of transoms 15 and 17 and from brackets 25 are pivotally supported pairs of transversely swingable hangers 29, each pair of which is connected by the usual cross bar 31, and the transversely aligned pairs support, through their cross bars 31, spring planks 33.

A bolster comprising longitudinally spaced transverse end members 35 and transversely spaced longitudinal side members 37 is positioned in the space bounded by the transoms 15 and 17 and middle axle wheels 1. The space bounded by members 35 and 37 is left open to receive the input portion of middle axle gear box $G_2$. The ends of bolster end members 35 are each curved slightly toward the adjacent end of the truck as at 39 and are extended transversely outwardly from their intersections with bolster side members 37 to form bolster corner extensions 41 in the spaces between transoms 15 and 17 respectively and the adjacent swing hanger brackets 25. Adjacent the intersections of bolster side members 37 with end members 35, the former are curved slightly inwardly as at 42 to clear swing hanger brackets 25. Bolster corner extensions 41 are seated on upright coil springs 43 carried by the ends of spring planks 33 and are provided on their transverse surfaces adjacent transoms 15 and 17 with vertical wearplates 45 adapted to slidably engage corresponding wearplates 47 on the adjacent transom and thus transmit acceleration and braking forces from the truck frame to the bolster while accommodating lateral movement of the bolster relative to the truck frame. The ends of bolster corner extensions 41 are provided with rubber beehive bumpers 49 to cushion lateral movements of the bolster by engagement with aligned pads 51 on the inner surfaces of truck frame side members 13. Between their intersections with bolster side members 37, 37, bolster end members 35 are depressed to permit the passage thereover of Cardan shafts $G_2$ and $G_3$, and transom 17, as well as transom 15, is correspondingly depressed at 53. To freely accommodate vertical movements of the bolster on springs 43, without interference between the depressed portions of bolster end members 35, and spring plank 33, the middle portion of the latter are depressed and offset, longitudinally of the truck, from the ends of the spring plank, toward the adjacent end of the truck. Intermediate bolster end members 35, 35 bolster longitudianlly extending side beams 37, 37 are bowed outwardly to provide clearance for bolster lateral motion relative to the middle axle gear box.

For supporting the locomotive underframe on the bolster each of the bolster corner extensions 41 is provided with an upwardly open cup-like loading pad 55 having a horizontal upwardly facing bottom surface 57. Each loading pad 55 is arcuate in plan and is surrounded by an upright wall 59. The outer portions 60 of walls 59 are curved about a common vertical axis at the center of the truck and are provided with correspondingly arcuate wearplates 61. For maintaining the locomotive underframe centered transversely of the bolster, bolster side members 37 are provided intermediate their ends with upright abutments 61 also curved about a common vertical axis at the center of the truck.

The locomotive underframe is provided with depending cylindrical feet 63 which extend into loading pad cups 55 and rotatably mount shoes 65 which are arcuate in plan corresponding to the arcuate shape of cups 55 but are shorter and thus movable within cups 55 to permit pivoting of the locomotive underframe in the cups relative to the bolster. The outer arcuate surfaces of shoes 65 are provided with wearplates 67 which are slidably engageable with wearplates 61 on loading pad upright walls 59 to accommodate relative arcuate movement and to transmit lateral and longitudinal forces from the bolster to the locomotive underframe. Since arcuate load transmitting walls 59 of the loading pad cups extend principally transversely of the truck because of the geometry of the bolster configuration, upright abutments 71 on the bolster side beams are provided and the arcuate surfaces of the latter extends principally longitudinally of the truck so as to adequately resist relative transverse forces between body and bolster when engaged by corresponding depending elements 69 from the locomotive underframe.

Operation of the truck is as follows: As the body mounted diesel engine (not shown) drives the truck through transmission T, main drive shaft M, truck mounted gear train unit U, Cardan shaft $C_1$, front axle gear box $G_1$, Cardan shaft $C_2$, middle axle gear box $G_2$, Cardan shaft $C_3$ and rear axle gear box $G_3$, vertical track irregularities are equalized by equalizer coil springs 19. Any lateral irregularities in the track are absorbed through swing hangers 29 and any vertical forces received by the truck frame are cushioned by bolster supporting coil springs 43, vertical and lateral movements of the bolster relative to the frame permitted by swing hangers 29 and springs 43 being accommodated by the slidable relation between bolster wearplates 45 and frame wearplates 47, with the driving forces provided the axles by the engines and associated mechanism being transmitted from the truck frame to the bolster by means of the cooperating wearplates. The same longitudinal driving forces as well as braking forces are transmitted from the bolster to the locomotive underframe by means of the outer arcuate walls 59 of loading pads 55 and the cooperating outer vertical surfaces of shoes 65 on the locomotive feet 63, vertical support of the locomotive body of the truck being afforded by engagement of the bottom of shoes 65 with the horizontal top surface 57 of loading pads 55. Relative lateral movement of the locomotive underframe and bolster is prevented by engagement of arcuate upright bearings 71 on the bolster side members 37 with the cooperating depending bearings 69 on the locomotive underframe. As the truck enters curved trackage swiveling relative to the locomotive underframe is permitted by the sliding arcuate relationship between locomotive shoes 65 and the outer arcuate walls 59 of the loading pads, any relative irregularities being accommodated by the pivotal mounting of locomotive shoes 65 on locomotive feet 63.

Similarly the arcuate engagement of the side mounted bearings 71 and the corresponding elements 69 on the locomotive underframe permit swiveling of the bolster and truck relative to the locomotive underframe about the exact center of the bolster. As the bolster moves laterally relative to the truck frame even though there is no substantial lateral movement permitted between the driving assembly comprising gear boxes G and Cardan shafts $C_1$, $C_2$ and $C_3$ relative to the truck frame, there will be no interference between the side members 37 of the bolster and the gear box of the middle axle because of the bowed out shape of the bolster side beams 37. Similarly, there will be no interference between the loading pads 55 and upstanding truck mounted transmission unit U as the bolster moves laterally relative to the truck frame. By placing the loading pads immediately over the bolster supporting coil springs so that the body load is transmitted directly through the loading pads onto the springs, thereby minimizing the necessary weight of the bolster side and end members since they function mainly as ties between the loading pads and not as vertical load bearing beams.

The details of the truck may be modified substantially without departing from the spirit of the invention and the exclusive use of such modifications as come within the scope of the appended claims is contemplated.

What is claimed is:

1. A railway vehicle truck comprising three wheel and axle assemblies spaced apart lengthwise of the truck, a truck frame supported therefrom and including transversely spaced longitudinally extending side members positioned outboard said wheels and a transverse transom intermediate the middle assembly and each end assembly, a generally rectangular bolster elongated longitudinally of the truck and comprising transversely spaced longitudinally extending side members located transversely inboard of said middle assembly wheels and longitudinally spaced transversely extending end members positioned adjacent said transoms and longitudinally inboard thereof, the region defined by said bolster side and end members being substantially wholly open, said bolster being resiliently supported from said frame adjacent the intersections of said bolster side and end members, transversely and longitudinally spaced horizontal upwardly facing bearing surfaces being provided on said bolster above all the supports thereof from said frame, said upwardly facing bearings each having an arcuate upright wall curved about a vertical axis at the center of the bolster and adapted for engagement with cooperating arcuate surfaces on structure depending from the vehicle underframe, said arcuate upright walls being elongated transversely of the truck, said bolster side members mounting, in substantial transverse alignment with its center, upright additional bearings comprising arcuate walls curved about a common vertical axis at the bolster center and adapted to engage mating bearing elements on the vehicle underframe for preventing relative lateral movement between said bolster and said supported underframe.

2. A railway vehicle truck according to claim 1 in which the ends of said bolster and members are extended transversely outwardly of said bolster side members and the supports of said bolster from said frame underlie said extensions.

3. A railway vehicle truck according to claim 2 in which said bolster end members are depressed between their intersections with said bolster side members to accommodate the passage thereover of locomotive drive shafts.

4. A railway vehicle truck according to claim 3 in which the central portions of said intermediate transoms are correspondingly depressed.

5. A railway vehicle truck according to claim 2 in which said truck frame side members are formed with inwardly extending brackets intermediate said transoms and adjacent each of said transoms and said bolster end member extensions are received between said brackets and the adjacent transoms.

6. A railway vehicle truck according to claim 5 in which said brackets and adjacent portions of said transoms mount depending swing hangers and said bolster is supported therefrom.

7. A railway vehicle truck according to claim 6 in which the support of said bolster from said swing hangers includes springs supported by said swing hangers under said bolster end member extensions.

8. A railway vehicle truck comprising three spaced wheel and axle assemblies, a truck frame resiliently supported therefrom and including longitudinally extending side members and spaced transverse transoms intermediate the middle and end assemblies, brackets extending inwardly from said side members between both said transoms and the middle assembly, swing hangers supported from said brackets and transoms, springs supported from said swing hangers, a bolster positioned between said side members and said transoms, said bolster comprising laterally spaced longitudinally extending side members and longitudinally spaced transversely extending end members adjacent said transoms and merging with each other inwardly of the end portions of said bolster end members, said end portions extending into the spaces between said brackets and said transoms and there being supported on said springs, said transoms and said bolster end members being depressed between their ends to accommodate the passage therethrough of driving apparatus, upwardly facing bearings being provided on said bolster end member end portions and each having an arcuate upright wall curved about a vertical axis at the center of the bolster, said arcuate upright walls being elongated transversely of the truck, and adapted for engagement with cooperating arcuate surfaces depending from the underframe of a supported locomotive, and upright arcuate bearings on the bolster side members intermediate the ends thereof and curved about said vertical axis and adapted for engagement with cooperating arcuate bearings depending from the underframe of a supported locomotive.

9. In a railway vehicle, a truck comprising three spaced wheel and axle assemblies, a truck frame resiliently supported therefrom and including longitudinally extending side members and spaced transverse transoms intermediate the middle and end assemblies, brackets extending inwardly from said side members between both said transoms and the middle assembly, swing hangers supported from said brackets and transoms, springs supported from said swing hangers, a bolster positioned between said side members and said transoms, said bolster comprising laterally spaced longitudinally extending side members and longitudinally spaced transversely extending end members adjacent said transoms and merging with each other inwardly of the end portions of said bolster end members, said end portions extending into the spaces between said brackets and said transoms and there being supported on said springs, said transoms and said bolster end members being depressed between their ends to accommodate the passage therethrough of driving apparatus, upwardly facing bearings being provided on said bolster end member end portions and each having an arcuate upright wall curved about a vertical axis at the center of the bolster, said arcuate upright walls being elongated transversely of the truck, upright arcuate bearings on the bolster side members intermediate the ends thereof and curved about said vertical axis, an underframe having first depending elements with arcuate surfaces seated on said upwardly facing bearings and engaging the arcuate walls of said bearings and additional depending elements with upright arcuate surfaces engaging said upright arcuate bearing surfaces.

References Cited by the Examiner

UNITED STATES PATENTS

| | | | |
|---|---|---|---|
| 7,094 | 2/1850 | Vanderhoof | 105—174 |
| 33,167 | 8/1861 | Youmans | 105—167 |
| 172,176 | 1/1876 | Roberts | 105—174 |
| 204,009 | 5/1878 | Dabney et al. | 105—199 |
| 578,760 | 3/1897 | McElroy | 105—114 |
| 1,174,936 | 3/1916 | Jackson | 105—190 |
| 1,225,882 | 5/1917 | Steffens | 105—158 |
| 1,717,058 | 6/1929 | Miller | 105—196 |
| 2,047,251 | 7/1936 | Bender | 105—188 |

ARTHUR L. LA POINT, *Primary Examiner.*

H. BELTRAN, *Assistant Examiner.*